United States Patent
Flegel

(10) Patent No.: US 8,098,465 B1
(45) Date of Patent: Jan. 17, 2012

(54) AFCI BREAKER PROVIDING PROTECTION FOR MULTIPLE BRANCH CIRCUITS IN AN ELECTRICAL PANEL

(75) Inventor: Michael O. Flegel, Racine, WI (US)

(73) Assignee: Reliance Controls Corporation, Racine, WI (US)

( * ) Notice: Subject to any disclaimer, the term of this patent is extended or adjusted under 35 U.S.C. 154(b) by 964 days.

(21) Appl. No.: 12/057,976

(22) Filed: Mar. 28, 2008

(51) Int. Cl.
*H02H 3/00* (2006.01)
(52) U.S. Cl. .......................................................... 361/42
(58) Field of Classification Search .................... 361/49, 361/42
See application file for complete search history.

(56) References Cited

U.S. PATENT DOCUMENTS

| | | | |
|---|---|---|---|
| 5,825,598 A * | 10/1998 | Dickens et al. | 361/42 |
| 6,021,034 A | 2/2000 | Chan et al. | |
| 6,144,537 A * | 11/2000 | Boteler | 361/42 |
| 6,477,021 B1 * | 11/2002 | Haun et al. | 361/42 |
| 6,504,692 B1 | 1/2003 | Macbeth et al. | |
| 7,538,557 B2 * | 5/2009 | DeHaven | 324/509 |
| 2004/0100274 A1 | 5/2004 | Gloster et al. | |
| 2005/0286184 A1 * | 12/2005 | Campolo | 361/42 |
| 2007/0030607 A1 * | 2/2007 | Liscinsky | 361/42 |
| 2007/0081281 A1 * | 4/2007 | Hamer | 361/42 |
| 2007/0201170 A1 * | 8/2007 | Hooper | 361/42 |

* cited by examiner

*Primary Examiner* — Ronald W Leja
(74) *Attorney, Agent, or Firm* — Boyle Fredrickson. s.c.

(57) ABSTRACT

An electrical panel has an Arc Fault Current Interrupter (AFCI) breaker connected to a power supply input, which is operative to interrupt current flow to multiple circuits when an arc fault is detected. The AFCI breaker, which may include Ground Fault Current Interrupter (GFCI) components, provides global arc fault and ground fault protection for multiple circuits of a load center, such as a main panel, sub-panel, transfer switch, and the like.

23 Claims, 3 Drawing Sheets

AFCI BREAKER PROVIDING PROTECTION FOR MULTIPLE BRANCH CIRCUITS IN AN ELECTRICAL PANEL

BACKGROUND OF THE INVENTION

This invention relates generally to a circuit protection device and, more particularly, to a system for providing Arc Fault Circuit Interrupter (AFCI) protection for multiple circuits.

Arc Fault Circuit Interrupter (AFCI) devices are commonly used to detect arcs in an electrical circuit, and to cut off the supply of power in a circuit when an arc is detected. Increasingly, electrical codes are requiring AFCI devices for bedrooms and other circuits where arc faults more frequently occur. An arc fault can result in a fire, and therefore there is a strong desire by homeowners, landlords, and the like to provide preventive devices, such as AFCI breakers.

In a conventional power distribution system, multiple AFCI breakers provide arc fault protection for the branch circuits of a load center. For example, primary power, typically from a utility, is fed to the load center, which has a main breaker that controls the supply of power from the primary power supply to a series of branch circuits. The branch circuits may include arc and ground fault protected circuits, ground fault only protected circuits, and other non-fault interrupted circuits. In a typical household application, the arc and ground fault protected circuits route power to bedroom outlets, the ground fault protected circuits route power to bathroom outlets, kitchen outlets, and outdoor outlets, and the other circuits route power to the remaining outlets, e.g., family rooms, hallways, living rooms, and the like.

Thus, in addition to the main breaker, the load center houses dedicated circuit breakers for each of the branch circuits. AFCI/GFCI breakers are used to provide arc and ground fault protection for the arc and ground fault protected circuits, GFCI breakers are used to provide ground fault protection for the ground fault protected circuits, and conventional current interrupting (CI) breakers are used to provide current overload/short circuit protection for the remaining circuits. The AFCI/GFCI breakers and GFCI breakers also provide current overload/short circuit protection in addition to arc and ground fault protection. In such a conventional implementation, a dedicated AFCI/GFCI breaker is needed for each of the arc and ground fault protected circuits. Thus, for a three bedroom home with two circuits per room, a total of six separate AFCI/GFCI breakers are needed at considerable more cost than GFCI-only or CI-only breakers. Moreover, if arc fault protection is desired for each of the circuits of a home, which will typically include twenty or more circuits, the cost increase is further amplified.

Despite the advantages of arc fault protection provided by AFCI breakers, the use of AFCI breakers has been limited as their cost is significantly more than conventional circuit breakers. The cost is amplified when considering that multiple AFCI breakers are needed to provide complete AFCI protection.

SUMMARY OF THE INVENTION

The present invention is directed to a system that provides AFCI protection for multiple circuits without the need for a dedicated AFCI breaker for each circuit or load.

In one representative implementation, power from a power supply, such as a utility, is fed to multiple circuits of a dwelling or building through a main breaker. The main breaker is an AFCI breaker and therefore provides global AFCI protection for each of the circuits electrically coupled to the power supply. The neutral conductors of each of the main panel loads as well as the neutral conductor of the AFCI breaker may also be tied together in a neutral bar. This allows the current on the neutral conductor of the AFCI breaker to be measured before the ground and neutral conductors are bonded together.

In another representative implementation, power is fed from an auxiliary power source, such as an electric generator, to a transfer switch, which includes an AFCI breaker and multiple switches to selectively energize loads to be powered by the auxiliary power source. In this implementation, power is fed to each of the loads, when the switches are in a conductive state, through the AFCI breaker so that detection of an arc fault will cause current flow to all of the loads to be interrupted without requiring each switch to be individually switched to a non-conductive state.

In addition to AFCI protection, the AFCI breaker may also provide Ground Fault Circuit Interrupter (GFCI) protection.

It is therefore an object of the present invention to provide AFCI protection for multiple branch circuits in an electrical power distribution system.

It is another object of the invention to provide AFCI protection for each load of a transfer switch with a single AFCI breaker.

Various other features and advantages of the present invention will be made apparent from the following detailed description and the drawings.

BRIEF DESCRIPTION OF THE DRAWINGS

The drawings illustrate the best mode presently contemplated of carrying out the invention.

In the drawings.

DETAILED DESCRIPTION OF THE PREFERRED EMBODIMENT

The present invention is directed to an AFCI breaker that provides global arc fault protection for multiple circuits of a power distribution system. In one representative implementation, the main panel or load center, also referred to as the "breaker box", of a building is fitted with a single AFCI breaker to provide global arc fault protection for all of the branch circuits of the load center. In another representative implementation, a transfer or sub-panel is fitted with an AFCI breaker to provide global arc fault protection for each of the circuits or loads connected to an auxiliary power supply, such as an electric generator, through the transfer panel. In the latter case, the present invention may be used with an automatic transfer switch that automatically energizes the transfer panel with a backup power supply during primary power interruption, as well as a manual transfer switch that requires manual switching of the transfer panel to the backup power supply during primary power interruption. Exemplary manual transfer switches are commercially available from Reliance Controls Corp. of Racine, Wis.

Figure 1:
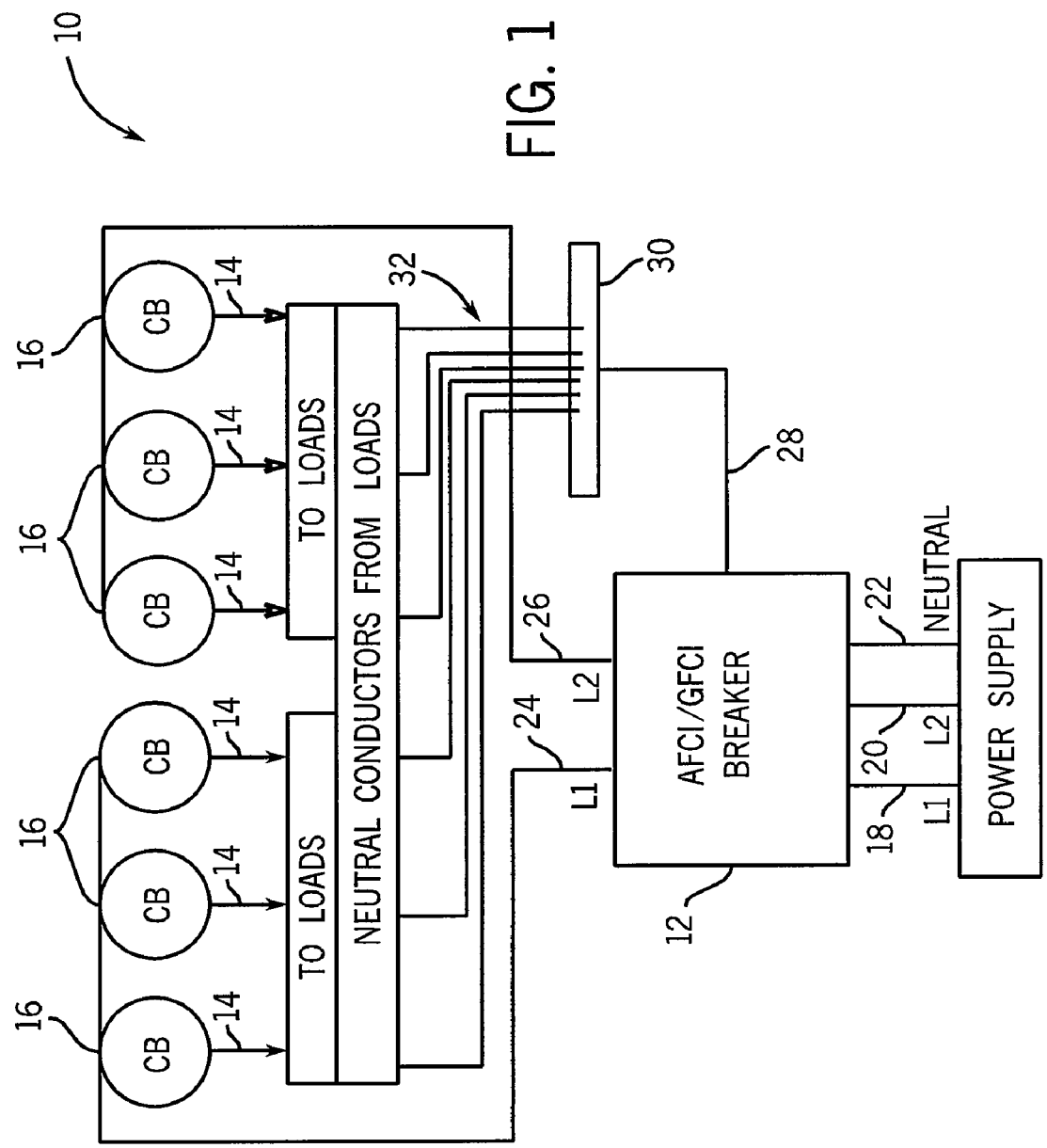
FIG. 1 is a schematic diagram illustrating implementation of one AFCI breaker to provide AFCI protection for multiple branch circuits of an electrical power distribution system according to one aspect of the invention.

Referring now to FIG. 1, in one representative implementation, the present invention is directed to a load center or power distribution panel 10 for use in an electrical power distribution system in a building, in which the conventional current-interrupting main breaker is replaced with an AFCI/GFCI breaker 12 which provides the functionality of a conventional current-interrupting main breaker but also provides global arc fault and ground fault protection for all the branch circuits, shown at 14, of the load center 10. Thus, conventional CI breakers 16 may be used to provide current overload/short circuit protection for each of the branch circuits 14 without a loss of arc fault and ground fault protection. As is well-known in the art, each circuit breaker 16 is interconnected between a line side conductor and a load side conductor such that current passes through the breaker 16 when the breaker 16 is in a conductive state or position.

The AFCI/GFCI breaker 12 has a pair of power inputs 18, 20 and a neutral input 22, and a pair of power outputs 24, 26 and a neutral output 28. The power outputs 24, 26 are connected to the CI breakers 16 in a known manner. The neutral output 28 is connected to a neutral bar 30. The load-side neutral conductors 32 are also connected to the neutral bar 30 to complete the circuit, as is known.

In one representative embodiment, the power inputs 18, 20 and neutral input 22 of the AFCI/GFCI breaker 12 are connected directly to a primary power supply, such as an electric utility. However, it is contemplated that primary power may be fed to the inputs through another electrical panel. It is also contemplated that the inputs may be directly connected to a secondary power supply, such as an electric generator or similar auxiliary power supply.

Figure 2:
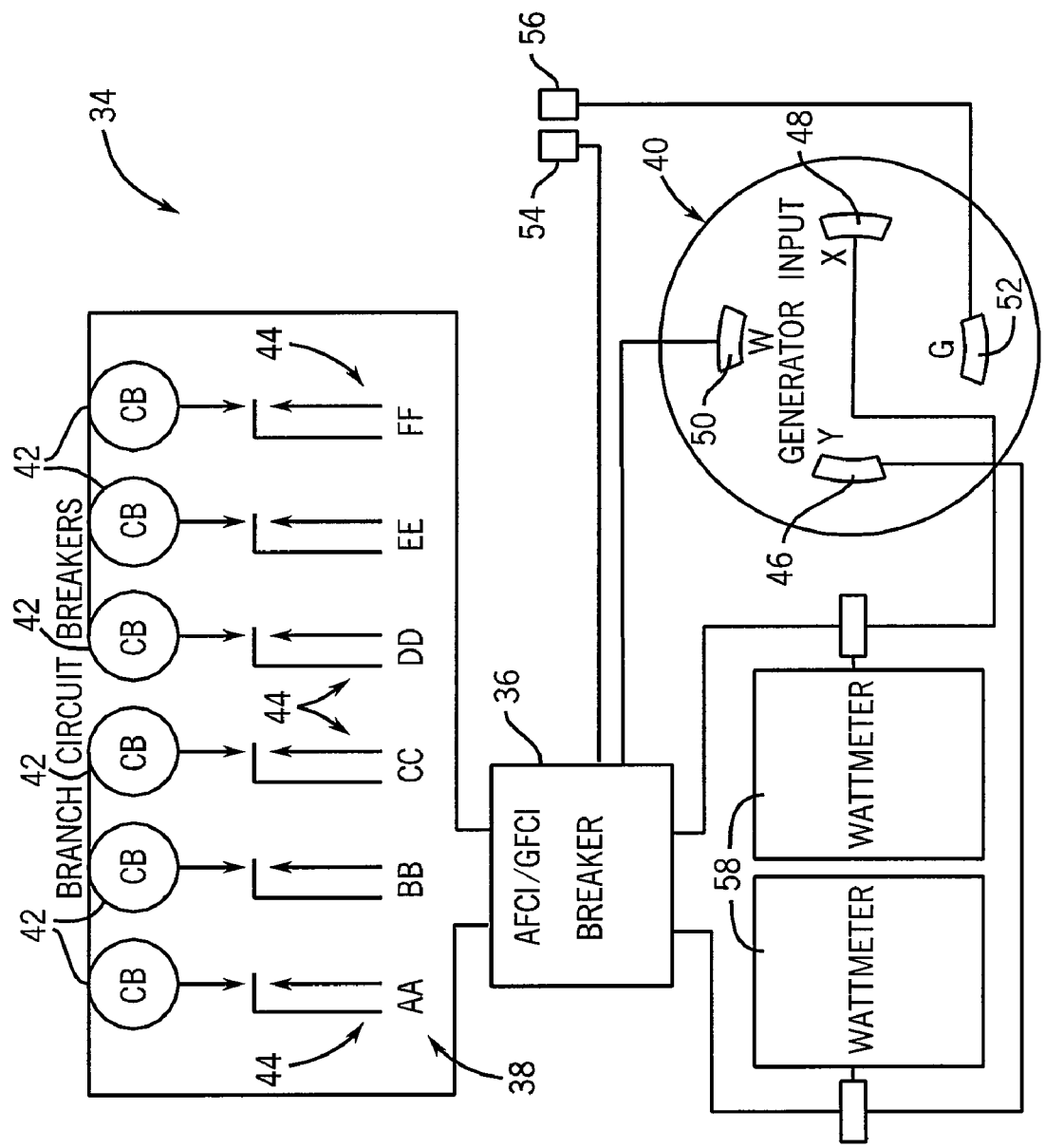
FIG. 2 is a schematic diagram illustrating implementation of one AFCI breaker to provide AFCI protection for multiple loads of a transfer switch according to another aspect of the invention.

It is also contemplated that the present invention may be implemented with a load side transfer switch, such as that schematically illustrated in FIG. 2. In this representative implementation, the transfer switch has a single AFCI/GFCI breaker 36 that is used to provide arc fault and ground fault protection for the loads/circuits 38 that are powered by a secondary power supply, such as an electric generator, through input interface 40 when primary (utility) power is interrupted or otherwise unavailable.

Similar to that shown in FIG. 1, the transfer switch 34, which may be an automatic or manual transfer switch, includes a series of CI circuit breakers 42 that each provide current overload/short circuit protection for a dedicated load 38 (individually labeled AA-FF) through a dedicated switch 44. Thus, while circuit breakers 42 provide conventional current overload/short circuit protection individually for the loads 38, global arc fault and ground fault protection is provided for all the loads 38 by the AFCI/GFCI breaker 36. Additionally, as is known, each circuit breaker 42 is interconnected between a line side conductor and a load side conductor such that current passes through the breaker 42 when the breaker 42 is in a conductive state or position.

The power input interface 40 may representatively be a four-wire interface that includes a pair of power inputs 46, 48, a neutral input 50, and a ground input 52. The power inputs 46, 48 are connected to the AFCI/GFCI breaker 36 as is neutral input 50 whereas the load 38 neutrals are connected to a neutral bar 54 and ground input 52 is fed to a ground bar 56. The transfer switch 34 may also have watt-meters 58 as known in the art.

Figure 3:
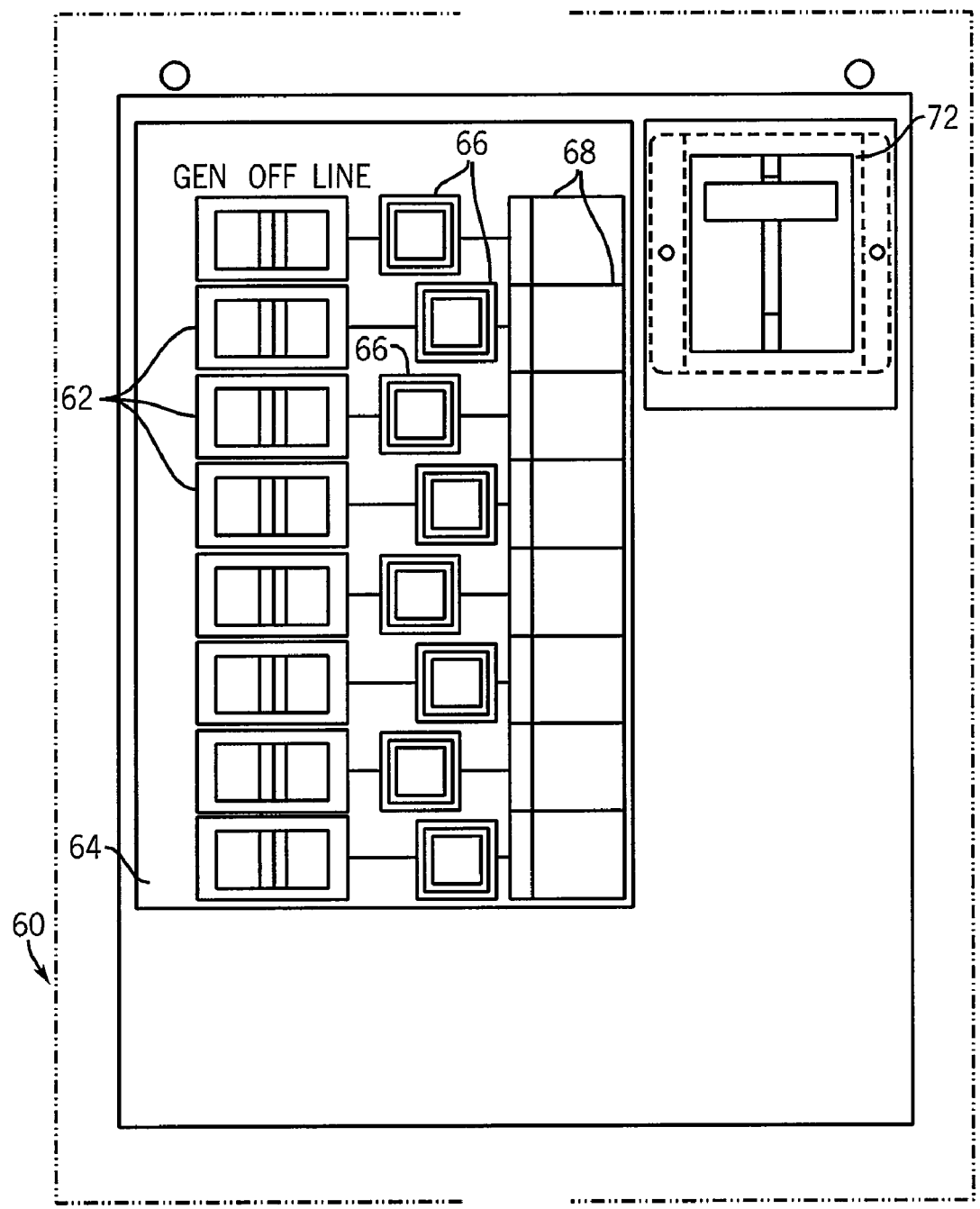
FIG. 3 is an elevation view of a transfer switch having a single AFCI breaker to provide arc fault protection for multiple circuits/loads according to the invention.

Referring now to FIG. 3, a representative transfer switch 60 incorporating components schematically illustrated in FIG. 2 is shown. It is understood that the present invention is not limited to a transfer switch such as that illustrated in FIG. 3, and may be incorporated in any type of transfer switch. The transfer switch 60 includes a series of conventional single pole double throw selector switches 62 mounted to a front wall 64. A circuit breaker 66 is connected to each selector switch 62. A circuit description area 68 is located in line with each selector switch 62 and circuit breaker 66, for receiving indicia identifying the circuits of the building electrical system in which switches 62 and circuit breakers 66 are connected. For each such circuit, switches 62 are movable between three different positions. A first position of switch 62 connects the circuit to the power supply from an auxiliary power supply such as a generator (not shown) through input interface 70, a second position connects the circuit to the power supply from a primary supply (not shown), such as utility power, and a third position is an OFF position which cuts off the power supply to the circuit.

Transfer switch 60 further includes a main double pole circuit breaker 72. As described with respect to FIG. 2, circuit breaker 72 is an AFCI/GFCI breaker thereby providing arc and ground fault protection in addition to current overload/short circuit protection for all of the circuits/loads connected through breakers 62.

The present invention has been described with respect to a main or sub-panel implementation as well as a transfer switch implementation; however, it is understood that the present invention is not so limited and may be incorporated in any load center or connection area in which multiple circuits are interconnected with a power supply. It is understood that configurations other than those described herein may benefit from an AFCI breaker that provides arc fault protection for multiple circuits, including the AFCI breaker being connected to the transfer switch but remotely located, with the power inlet in a more convenient location. Further, it is contemplated that in some implementations, it may be necessary for a load center to have multiple AFCI breakers, that each provides arc fault protection for one or more circuits. It is also contemplated that the present invention may be used with a subset of branch circuits. In this version, the AFCI breaker is connected to the main power supply breaker, and a selected subset of branch breakers are connected to the AFCI breaker so as to receive power from the main breaker through the AFCI breaker Additionally, it is contemplated that a building may have a power distribution system that has a main panel or load center with an AFCI/GFCI breaker to provide arc fault and ground fault protection for the branch circuits of the load center and further has a transfer switch or transfer panel with an AFCI/GFCI breaker to provide arc fault and ground fault protection for the branch circuits of the transfer switch. In such a power distribution system, arc fault and ground fault protection is provided independent of which power supply is online.

Therefore, in accordance with one embodiment, the present invention is directed to an electrical panel for regulating power from a power supply to a plurality of branch circuits. The electrical panel is configured to have a plurality of line side conductors and a plurality of load side conductors paired with one another such that each line side conductor is paired with a load side conductor. Each line side conductor is electrically coupled to the power supply and each load side conductor is electrically associated with a load. The electrical panel further includes a plurality of circuit breakers, each of which is associated with a paired line side conductor and load side conductor, with each circuit breaker being adapted to conduct power from a line side conductor to a load side conductor when in a conductive state. An AFCI breaker is electrically interconnected between the plurality of line side conductors and the power supply, and is adapted to provide arc fault protection for the plurality of branch circuits.

The electrical panel may be used as a main panel or load center as well as a sub-panel that is powered directly by a primary supply, indirectly by the primary power supply through a main panel, or directly by a secondary power supply, such as a generator. The electrical panel may also be incorporated into a transfer switch.

The present invention may also be embodied in a method of providing arc fault protection for a plurality of branch circuits of a load center, such as a main panel, sub-panel, or transfer switch. The method includes providing current to a plurality of branch circuits from a power supply through a single AFCI breaker and substantially simultaneously interrupting current flow from the power supply to all of the branch circuits when an arc fault condition is detected.

According to yet another embodiment, a power distribution system for providing power to a plurality of circuits connected to a power supply through a load center includes a first power supply that supplies primary power to the plurality of circuits and a first AFCI breaker interconnected between the first power supply and the plurality of circuits that is adapted to interrupt current flow to the plurality of circuits when an arc fault condition occurs. In a further embodiment, the power distribution system may include a second power supply that supplies secondary power to at least a portion of the plurality of circuits when primary power is interrupted and a second AFCI breaker interconnected between the second power supply and the at least a portion of the plurality of circuits that is adapted to interrupt current flow to the at least a portion of the plurality of circuits.

In accordance with yet another embodiment, the present invention is directed to an AFCI breaker that has an input adapted to be electrically connected to a power supply and an output adapted to be electrically connected to a plurality of circuits and provide global arc fault protection for the plurality of circuits.

The present invention has been described in terms of the preferred embodiment, and it is recognized that equivalents, alternatives, and modifications, aside from those expressly stated, are possible and within the scope of the appending claims.

What is claimed is:

1. An electrical distribution arrangement for regulating power from a power supply to a plurality of branch circuits, the electrical distribution arrangement comprising:
   a plurality of line side conductors and a plurality of load side conductors paired with one another such that each line side conductor is paired with a load side conductor, and wherein each line side conductor is electrically coupled to the power supply and each load side conductor is electrically associated with a load;
   a plurality of circuit breakers, each circuit breaker associated with a paired line side conductor and load side conductor and each circuit breaker adapted to conduct power from a line side conductor to a load side conductor when in a conductive state; and
   an Arc Fault Circuit Interrupter (AFCI) breaker electrically interconnected between the plurality of line side conductors and the power supply, wherein the AFCI breaker is positioned and arranged to provide AFCI protection for the plurality of circuit breakers.

2. The electrical distribution arrangement of claim 1 wherein the AFCI breaker includes a pair of power inputs, a neutral input, a pair of power outputs, and a neutral output, and wherein the neutral output is electrically coupled to neutral conductors for each of the branch circuits.

3. The electrical distribution arrangement of claim 2 further comprising a neutral bar adapted to provide interconnection of the neutral output of the AFCI breaker and the neutral conductors of the branch circuits.

4. The electrical distribution arrangement of claim 1 wherein the AFCI breaker is further adapted to provide Ground Fault Circuit Interrupter (GFCI) protection for the plurality of branch circuits.

5. The electrical distribution arrangement of claim 1 wherein the power supply is an electric generator.

6. The electrical distribution arrangement of claim 1 wherein the power supply is a utility power supply.

7. The electrical distribution arrangement of claim 1 wherein the AFCI breaker is a double-pole breaker.

8. A method of providing arc fault protection for a plurality of branch circuits of an electrical distribution system, comprising:
   providing a plurality of circuit breakers, each circuit breaker being connected to a branch circuit;
   providing current to the plurality of circuit breakers from a power supply through a single AFCI breaker; and
   substantially simultaneously interrupting current flow from the power supply to all of the circuit breakers by operation of the single AFCI breaker when an arc fault condition is detected.

9. The method of claim 8 further comprising substantially simultaneously interrupting current flow from the power supply to all of the branch circuits when a ground fault condition is detected.

10. The method of claim 8 wherein the act of providing current includes electrically coupling the AFCI breaker to the power supply and electrically coupling each of the branch circuits to the AFCI breaker.

11. The method of claim 10 wherein the power supply is an electric generator.

12. The method of claim 10 wherein the power supply is a utility power supply.

13. The method of claim 8 wherein the act of providing current includes electrically coupling a neutral output of the AFCI breaker to each neutral conductor of the branch circuits.

14. A power distribution system for providing power to a plurality of circuits connected to a power supply, comprising:
   a plurality of circuit breakers, each circuit breaker connected between the power supply and one of the circuits;
   a first power supply that supplies primary power to the plurality of circuit breakers; and
   a first AFCI breaker interconnected between the first power supply and the plurality of circuit breakers and adapted to interrupt current flow to the plurality of circuit breakers from the first power supply when an arc fault condition occurs when primary power is being delivered by the first power supply.

15. The power distribution system of claim 14 further comprising:
   a second power supply that supplies secondary power to at least a portion of the plurality of circuit breakers when primary power is interrupted; and
   a second AFCI breaker interconnected between the second power supply and the at least a portion of the plurality of circuit breakers and adapted to interrupt current flow to the at least a portion of the plurality of circuit breakers from the second power supply when an arc fault condition occurs when secondary power is being delivered by the second power supply.

16. The power distribution system of claim 15 wherein the second AFCI breaker is further adapted to interrupt current flow to the at least a portion of the plurality of circuit breakers from the second power supply when a ground fault condition occurs when secondary power is being delivered.

17. The power distribution system of claim 15 wherein the second power supply is an electric generator.

18. The power distribution system of claim 15 wherein the first AFCI breaker is further adapted to interrupt current flow to the plurality of circuit breakers from the first power supply when a ground fault condition occurs when primary power is being delivered.

19. The power distribution system of claim 14 wherein the primary power supply is a utility power supply.

20. The power distribution system of claim 14 wherein the first AFCI breaker is further adapted to interrupt current flow to the plurality of circuit breakers from the first power supply when a ground fault condition occurs.

21. An electrical distribution system, comprising:
an input adapted to be electrically connected to a power supply;
an output adapted to be electrically connected to a plurality of circuits;
a plurality of circuit breakers electrically connected between the input and the output; and
an AFCI breaker interposed between the input and the output, wherein the AFCI breaker provides global arc fault protection for all of the plurality of circuits and wherein the circuit breakers are located downstream of the AFCI breaker.

22. The system of claim 21 wherein the AFCI breaker is located remotely from the plurality of circuit breakers.

23. The system of claim 21 further comprising an electrical panel housing the plurality of circuit breakers and the AFCI breaker.

* * * * *